(12) United States Patent
Chaudhuri et al.

(10) Patent No.: US 9,307,459 B2
(45) Date of Patent: Apr. 5, 2016

(54) METHOD AND SYSTEM FOR NEIGHBOR REPORTING IN A MOBILE COMMUNICATION NETWORK

(71) Applicant: Wipro Limited, Bangalore (IN)

(72) Inventors: Saptarshi Chaudhuri, Bangalore (IN); Avijit Manna, Kolkata (IN); Shyam Sundar Pal, Kolkata (IN)

(73) Assignee: Wipro Limited, Bangalore (IN)

( * ) Notice: Subject to any disclaimer, the term of this patent is extended or adjusted under 35 U.S.C. 154(b) by 87 days.

(21) Appl. No.: 14/259,617

(22) Filed: Apr. 23, 2014

(65) Prior Publication Data

US 2015/0264607 A1    Sep. 17, 2015

(30) Foreign Application Priority Data

Mar. 11, 2014    (IN) ............................ 1266/CHE/2014

(51) Int. Cl.
*H04W 36/00*    (2009.01)
(52) U.S. Cl.
CPC ................................ *H04W 36/0061* (2013.01)
(58) Field of Classification Search
CPC ................................................. H04W 36/0061
USPC ........................................................ 455/436
See application file for complete search history.

(56) References Cited

U.S. PATENT DOCUMENTS

2009/0047958 A1\*    2/2009    Rimhagen ........... H04J 11/0093
                                                              455/436
2009/0264130 A1\*   10/2009    Catovic ............. H04W 36/0083
                                                              455/436

\* cited by examiner

*Primary Examiner* — Chuong A Ngo
(74) *Attorney, Agent, or Firm* — LeClairRyan, a Professional Corporation

(57) ABSTRACT

A method, neighbor relation maintenance device, and non-transitory computer readable medium for neighbor reporting in a wireless communication network is disclosed. The method comprises categorizing, by a neighbor relation maintenance device, a plurality of Mobile Stations (MSs) into one or more groups. A primary neighbor BS for each group of the one or more groups of MSs is determined. Each MS of each group is instructed to report signal strength measurements between the each MS and the corresponding primary neighbor BS associated with the each group in a first time period. Each MS of each group is instructed to report signal strength measurements between the each MS and each neighbor BS in a predefined neighbor list associated with the each MS in a second time period.

20 Claims, 6 Drawing Sheets

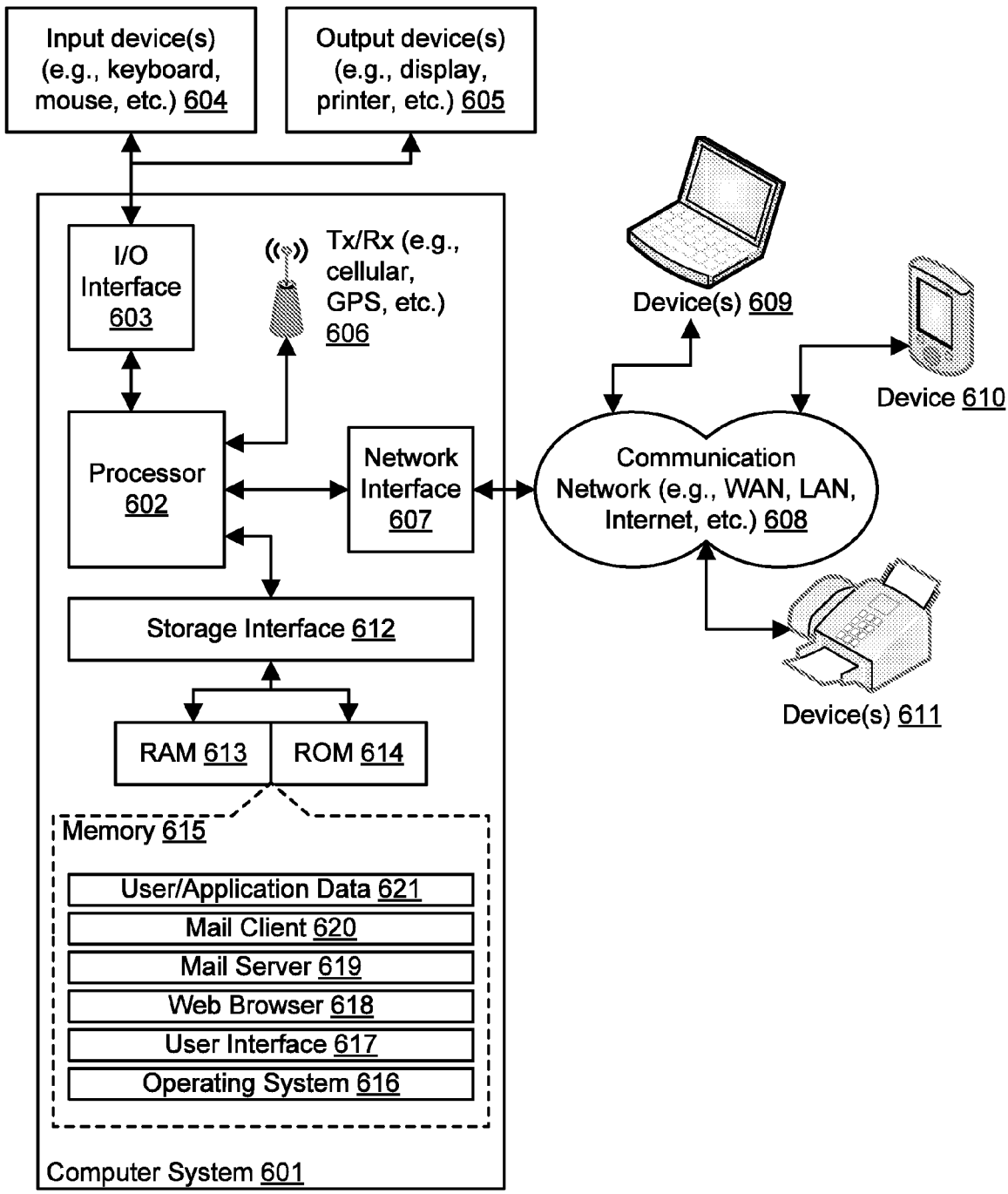
FIG. 6: Example Computer System

METHOD AND SYSTEM FOR NEIGHBOR REPORTING IN A MOBILE COMMUNICATION NETWORK

CROSS-REFERENCE TO RELATED APPLICATIONS

This application claims the benefit of Indian Patent Application Filing Number 1266/CHE/2014, filed on Mar. 11, 2014, which is hereby incorporated by reference in its entirety.

FIELD

This disclosure relates generally to handover of a Mobile Station (MS) from a serving Base Station (BS) to a neighbor BS, and more particularly to a method and system for neighbor reporting in a wireless communication network.

BACKGROUND

One of the requirements of mobile telecommunication systems is to provide unbroken connections between Base Stations (BSs), also called Evolved Node Bs or eNodeBs or eNBs, and Mobile Stations (MSs) or User Equipment (UE) moving at high speeds. This feature of providing unbroken connections may be accomplished by a serving BS by performing a handover or handoff to another BS. The serving BS decides when to initiate the handover and to which BS the MS needs to be handed over. Typically, the serving BS may handover a MS to a neighbouring BS. In order to determine which of many neighbours to handover a MS, the serving BS may maintain a neighbour list for a MS comprising a listing of signal strength values between the MS and each of the neighbours accessible to the MS. The MS may regularly report the signal strength between itself and each of the neighbours accessible to the MS to the serving BS.

In a sufficiently large network, the list of relevant neighbors for each MS may be large. However, there may be a possibility that some of the neighbors cannot qualify as neighbor candidates as the handover to such neighbors may not have happened for a long period of time and is unlikely to happen in the immediate future. Also, for some of the neighbors, the qualifying potential service level (for example RSRP values, etc.) may be outside acceptable limits. And hence maintaining them as neighbors may not make sense.

Further, measurement of qualifying potential service level parameters at a MS is typically a resource intensive (battery, processing power, etc.) activity as it is frequently performed at the MS. Performing this activity for a long neighbour list as provided by serving BS may impact operations and performance of the MS. Furthermore, maintaining a MS specific neighbor list with multiple entries for each neighbor list at the serving BS may also be time and resource intensive at the serving BS and may impact operations and performance of the BS in a negative way, when a large number of UEs are connected to the BS/eNB.

SUMMARY

In one embodiment, a method of neighbor reporting in a mobile communication network is disclosed. The method comprises categorizing, by a neighbor relation maintenance device, a plurality of Mobile Stations (MSs) into one or more groups, wherein the plurality of MSs are associated with a serving Base Station (BS); determining, by the neighbor relation maintenance device, a primary neighbor BS for each group of the one or more groups of MSs; instructing each MS of each group to report signal strength measurements between the each MS and the corresponding primary neighbor BS associated with the each group in a first time period; and instructing each MS of each group to report signal strength measurements between the each MS and each neighbor BS in a predefined neighbor list associated with the each MS in a second time period. The predefined neighbor list associated with the each MS may include one or more neighbor BSs accessible by the each MS.

In another embodiment, a neighbor relation maintenance device for neighbor reporting implemented at a serving Base Station (BS) is disclosed. The neighbor relation maintenance device comprises: a processor; and a memory disposed in communication with the processor and storing processor-executable instructions, the instructions comprising instructions to: categorize a plurality of Mobile Stations (MSs) into one or more groups, wherein the plurality of MSs are associated with the serving BS; determine a primary neighbor BS for each group of the one or more groups of MSs; instruct each MS of each group to report signal strength measurements between the each MS and the corresponding primary neighbor BS associated with the each group in a first time period; and instruct each MS of each group to report signal strength measurements between the each MS and each neighbor BS in a predefined neighbor list associated with the each MS in a second time period. The predefined neighbor list associated with the each MS may include one or more neighbor BSs accessible by the each MS.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 6 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
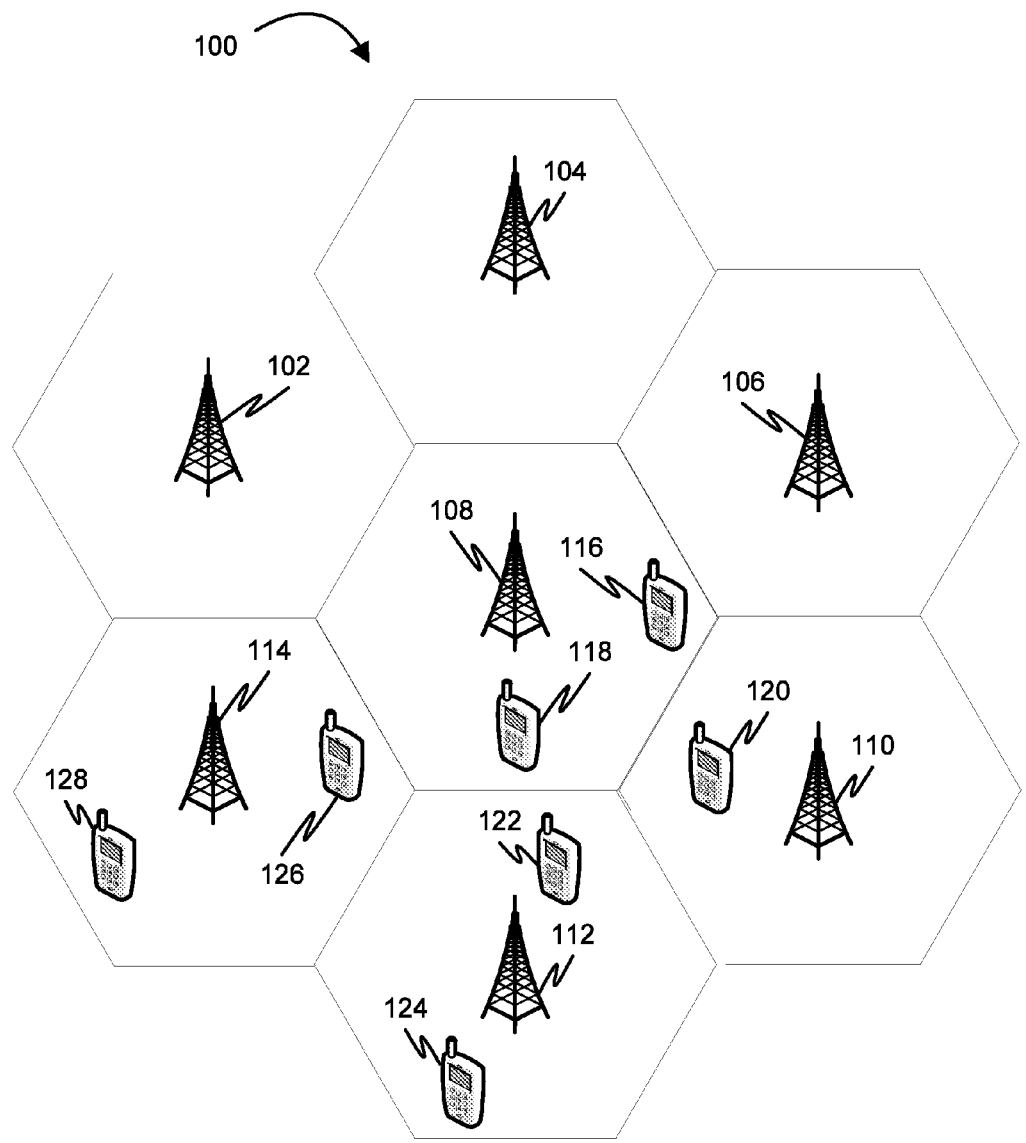
FIG. 1 illustrates an exemplary high level network depicting a mobile communication network architecture in which various embodiments of the disclosure may function.

An exemplary high level network 100 depicting a mobile communication network architecture in which various embodiments of the invention may function is illustrated in FIG. 1. Network 100 may include, but is not limited to, cellular networks such as Global System for Mobile Communications (GSM), Code Division Multiple Access (CDMA), third generation (3G) network, and Long Term Evolution (LTE) network. Mobile communication network 100 may include one or more Base Stations (BSs) such as BSs 102-114 and one or more Mobile Stations (MSs) such as MSs 116-128.

At a given point in time a MS may be in wireless communication with a single BS. In other words, the MS may be served by a single BS. This BS is typically called the serving BS. The serving BS provides a link between the MS and the wider mobile network. For example, in FIG. 1, BS 108 may be the serving BS for the MS 116 and the MS 118. Similarly, BS 110 may be the serving BS for the MS 120. Each BS may be associated with a range, wherein the range of a BS corresponds to the area to which the BS can transmit wireless signals. Thus, each BS may be the serving BS for a number of MSs lying within the transmitting range of the BS.

When an MS moves from the serving area of one BS to the serving area of another BS, a handover or handoff process may be initiated to provide an unbroken connection to the MS. A handover process typically involves transferring a call from a serving BS to one of the neighbor BSs depending on the direction of motion of the MS. For example, if MS 118 moves away from serving BS 108 towards BS 110, then BS 108 may handover MS 118 to BS 110. BS 110 then becomes the serving BS for MS 118 and provides the link between MS 118 and the wider communication network.

In order to determine which neighbor BS to handover a MS to, the serving BS maintains a neighbor list of all neighbors accessible to the MS and also the signal strength between the MS and each one of the neighbors accessible to the MS. A neighbor list is maintained by the serving BS for each MS being served by the serving BS. To populate the neighbor list, the serving BS may instruct a MS currently being served by the serving BS to periodically report signal strength measurements between itself and each neighbor BS from which it receives a signal. This may be called neighbor reporting. In addition to reporting about its neighbors, each MS may also report signal strength between itself and the current serving BS. Neighbor reporting usually involves each MS transmitting a measurement report comprising signal strength measurements between it and neighboring BSs from which the MS receives a signal. For example, MS 116 may be able to receive a signal from BS 106 and BS 110 based on the proximity between MS 116 and each of BS 106 and BS 110 and may not receive a signal from BS 102, BS 104, BS 112, and BS 114. Thus, BS 106 and BS 110 may be considered neighbor BSs relative to MS 116. MS 116 may report the signal strength between MS 116 and each of BS 106 and BS 110 to current serving BS 108. Serving BS 108 may use the measurement reports provided by MS 116 to determine a potential neighbor to which MS 116 is to be handed over.

The measurement reports provided by a MS to the serving BS may enable the serving BS to determine a direction of motion of the MS and accordingly a potential neighbor to which the MS is to be handed over. For example, if MS 118 moves from the serving area of BS 108 towards BS 104, the signal strength measurements between MS 118 and each of BSs 108, 110, 112, and 114 may decrease while at the same time the signal strength measurements between MS 118 and each of BSs 102, 104, and 106 may increase. By analyzing these measurements, BS 108 may determine an appropriate neighbor to which the MS 118 can be handed over and accordingly proceed with the handover.

Figure 2:
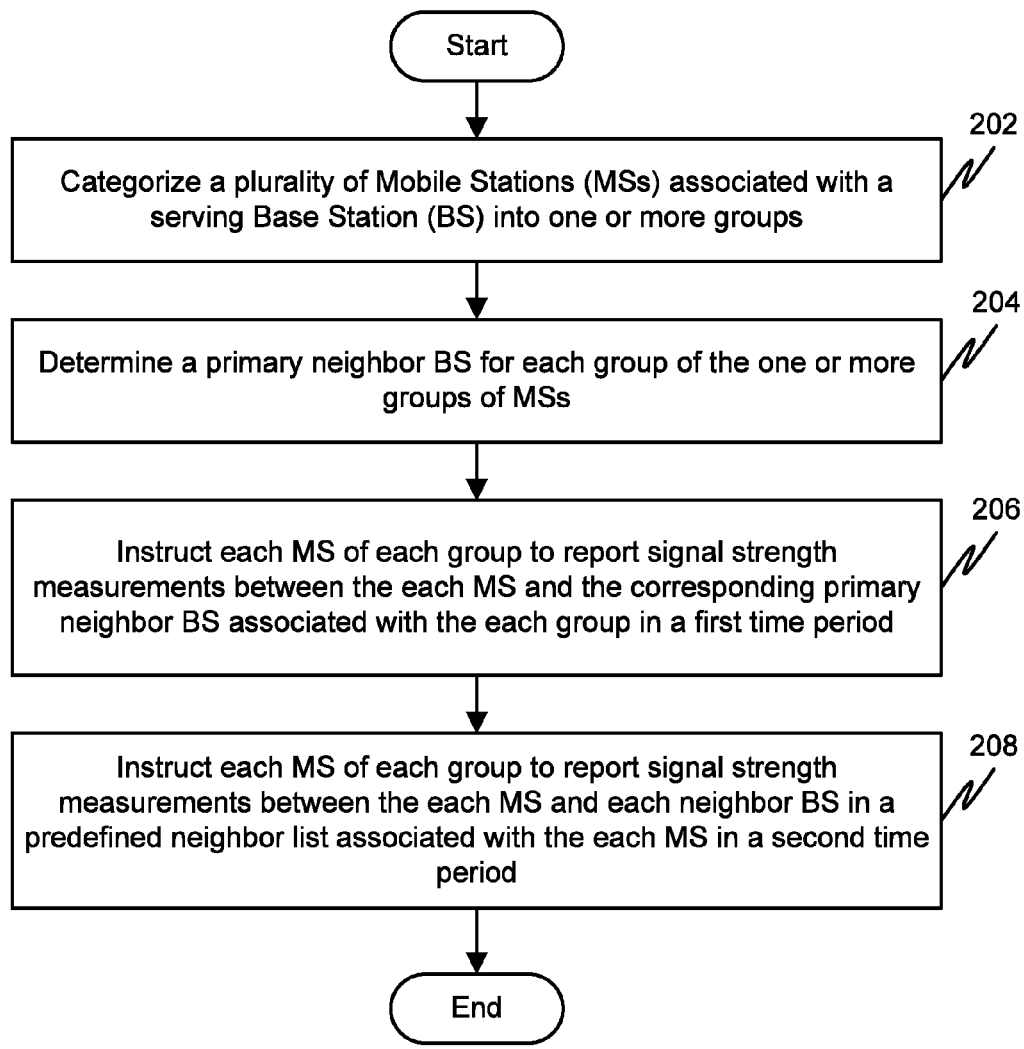
FIG. 2 illustrates a flow diagram of a method of neighbor reporting in accordance with some embodiments of the present disclosure.
Figure 3:
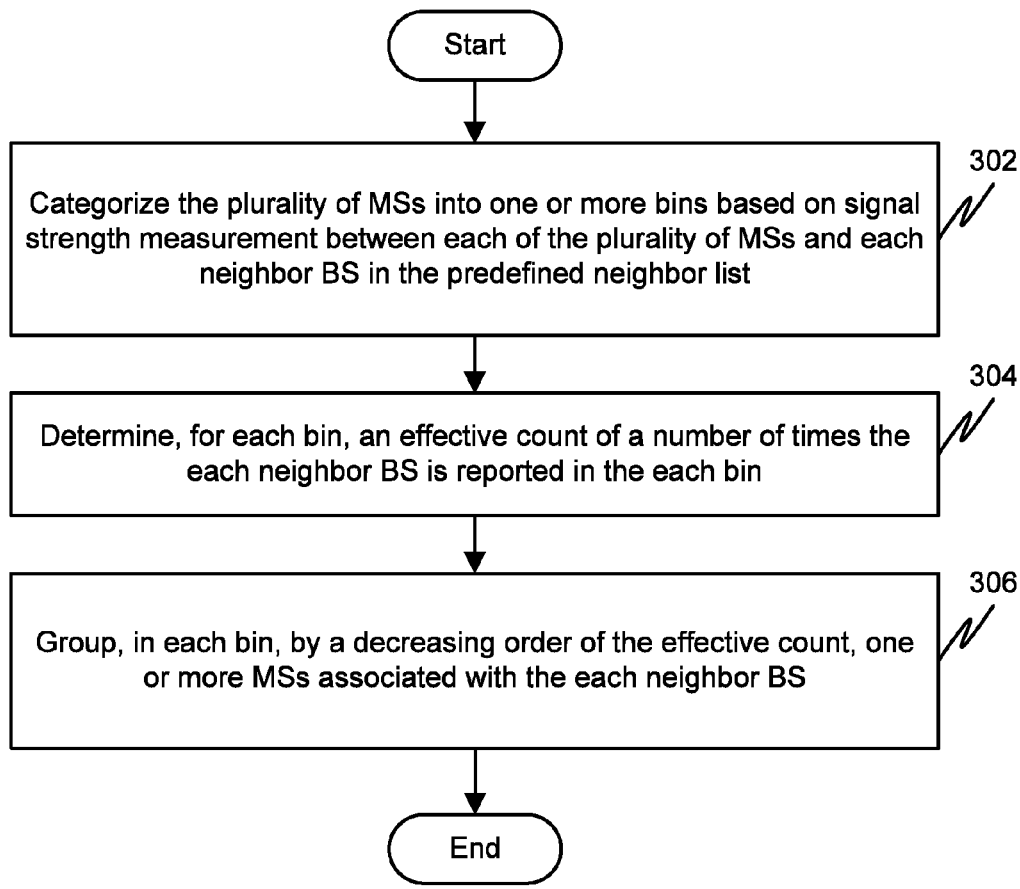
FIG. 3 illustrates a flow diagram of an exemplary method of categorizing a plurality of Mobile Stations (MSs) into one or more groups in accordance with some embodiments of the present disclosure.

A method of neighbor reporting in a mobile communication network in accordance with some embodiments of the invention will now be explained with reference to FIG. 2. The method involves, categorizing, by a neighbor relation maintenance device, a plurality of Mobile Stations (MSs) associated with a serving Base Station (BS) into one or more groups at step 202. In order to categorize the MSs into one or more groups, the neighbor relation maintenance device associated with the serving BS may first instruct all MSs associated with the serving BS to report signal strength measurements between the each MS and each neighbor BS. In other words, the serving BS may instruct all MSs to perform a global neighbor reporting. The MSs may then be grouped based on the signal strength measurements, such that each MS in a group has the highest relative signal strength with respect to a common neighbor BS as compared to the relative signal strength between any other neighbor BS. Categorizing the MSs into the one or more groups will be explained in further detail in conjunction with FIG. 3.

On determining the groups of MSs, the neighbor relation maintenance device may determine a primary neighbor BS for each group at step 204. The primary neighbor, in some embodiments, may correspond to the common neighbor BS relative to which each MS in a group of MSs has the greatest signal strength. Now referring to FIG. 3, a method of categorizing the MSs into one or more groups will be explained. At step 302, the plurality of MSs associated with a serving BS may be categorized into bins based on the signal strength measurement between each MS and each neighbor. Each bin may be associated with a range having an upper threshold signal strength value and a lower threshold signal threshold value. For example, a first bin may be defined having an upper threshold signal strength value −75 dBm and a lower threshold signal strength value −85 dBm. Similarly, a second bin, a third bin, and a fourth bin having ranges −86 dBm to −95 dBm, −96 dBm to −105 dBm, and −106 dBm to −115 dBm respectively may be defined. In some embodiments, a hysteresis value or a tolerance value may be considered when defining the bins. The number of bins and the ranges for each bin may be configurable by the service provider. On creating the various bins, the MSs associated with the serving BS may be categorized into one of the bins based on their signal strength with a neighbor BS.

Figure 4:
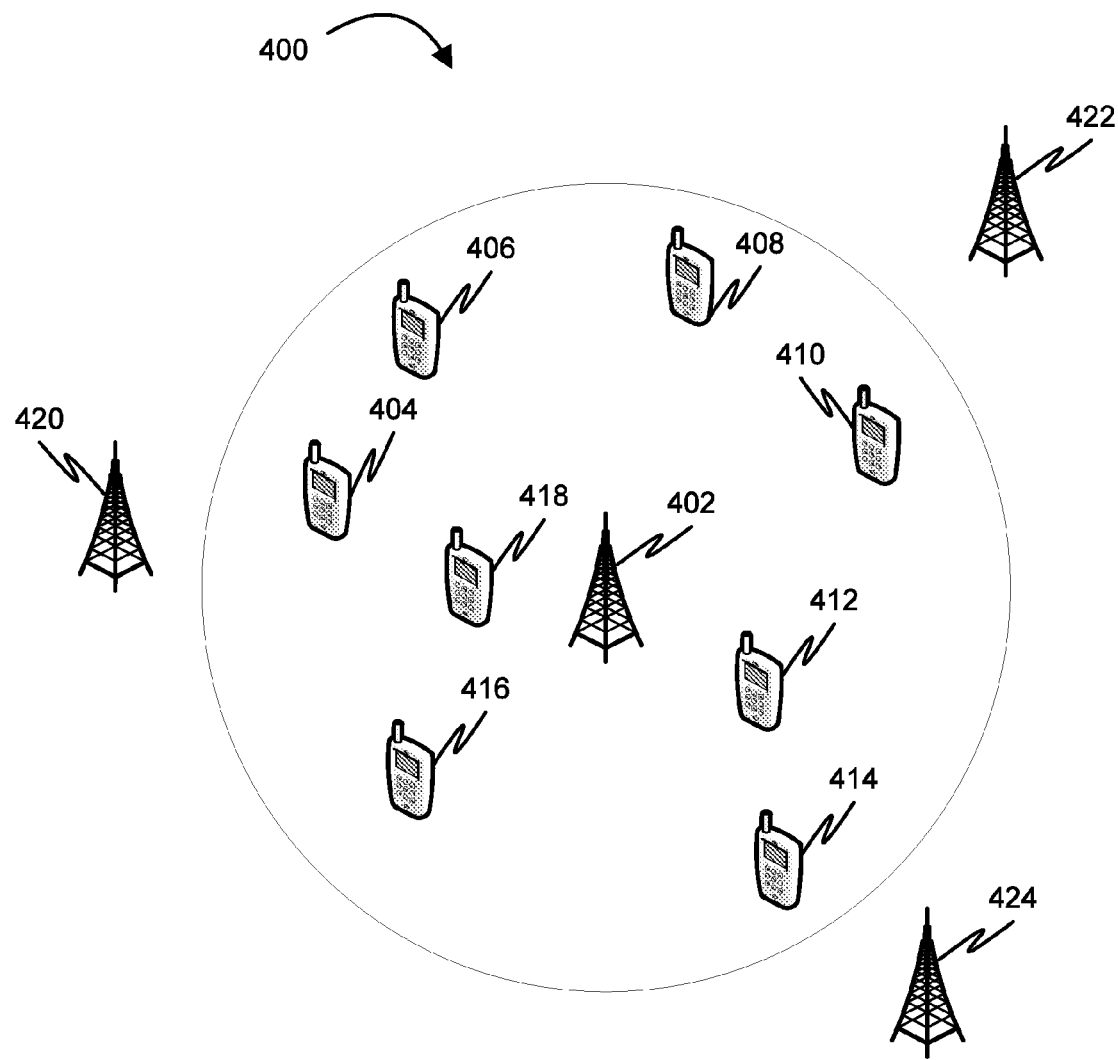
FIG. 4 illustrates an exemplary mobile communication network explaining a method of categorizing a plurality of MSs into one or more groups in accordance with some embodiments of the present disclosure.

An exemplary mobile communication network 400 is illustrated in FIG. 4 to further explain the process of categorizing the plurality of MSs into one or more groups. As shown in FIG. 4, a serving BS 402 may serve a plurality of MSs such as MSs 404-418. Mobile communication network 400 may further include one or more neighboring BSs such as BS 420, BS 422, and BS 424. In order to categorize the MSs based on signal strength between the MSs and the various neighbor BSs, one or more bins may be created. For example, a first bin having a range −75 dBm to −85 dBm a second bin having a range −86 dBm to −95 dBm and a third bin having signal strength range from −96 dBm to −105 dBm may be created. Here, the first bin may be associated with the strongest signal strength followed by the second bin followed by the third bin. Once the bins are created, the MSs may be categorized into one of these bins based on relative signal strength between the MSs and each neighbor. This may be done based on each measurement report received by the serving BS from the MSs in a predefined time period. Based on the signal strength measurements from successive measurement reports in the predefined time period, the MSs may be categorized into the three bins as shown in Table 1:

TABLE 1

| First Bin (−75 dBm to −85 dBm) | Second Bin (−86 dBm to −95 dBm) | Third Bin (−96 dBm to −105 dBm) |
| --- | --- | --- |
| MS 408 ←→ BS 422 | MS 412 ←→ BS 424 | MS 406 ←→ BS 422 |
| MS 410 ←→ BS 422 | MS 406 ←→ BS 420 | MS 414 ←→ BS 420 |
| MS 414 ←→ BS 424 | MS 416 ←→ BS 424 | MS 412 ←→ BS 422 |
| MS 404 ←→ BS 420 | MS 416 ←→ BS 420 | MS 418 ←→ BS 424 |
| MS 408 ←→ BS 422 | MS 418 ←→ BS 420 | MS 412 ←→ BS 422 |
| MS 410 ←→ BS 422 | MS 406 ←→ BS 420 | MS 408 ←→ BS 420 |
| MS 408 ←→ BS 422 | MS 418 ←→ BS 420 | MS 412 ←→ BS 422 |

The entries in the first bin indicate that the signal strength between the MS and the BS is the greatest compared to the signal strength between the MS and other BSs in other bins. Similarly, the entries in the third bin indicate the lowest signal strength between an MS and a particular neighbor BS. For example, MS 408 may have the strongest relative signal strength with respect to BS 422 and the lowest relative signal strength with respect to BS 420. Similarly, MS 410 may have the strongest relative signal strength with respect to BS 422 and the second strongest relative signal strength with BS 424.

Referring back to FIG. 3, once the MSs are categorized into one or more bins based on their signal strength relative to one or more BSs, a count of a number of times each neighbor BS is reported in the each bin by each MS may be determined. In keeping with the above example, in the first bin, MS 408 reports BS 422 three times in the predefined time period. The count of the number of times each MS reports each neighbor BS is indicated in brackets in Table 2.

TABLE 2

| First Bin (−75 dBm to −85 dBm | Second Bin (−86 dBm to −95 dBm) | Third Bin (−96 dBm to −105 dBm) |
| --- | --- | --- |
| MS 408 ←→ BS 422 (3) | MS 406 ←→ BS 420 (2) | MS 412 ←→ BS 422 (3) |
| MS 410 ←→ BS 422 (2) | MS 418 ←→ BS 420 (2) | MS 406 ←→ BS 422 (1) |
| MS 414 ←→ BS 424 (1) | MS 412 ←→ BS 424 (1) | MS 414 ←→ BS 420 (1) |
| MS 404 ←→ BS 420 (1) | MS 416 ←→ BS 424 (1) | MS 418 ←→ BS 424 (1) |
|  | MS 416 ←→ BS 420 (1) | MS 408 ←→ BS 420 (1) |

On determining the count of the number of times each MS reports each neighbor in a bin, an effective count value (ECV) may be determined for each BS at step 304. The ECV for a BS, may be calculated as:

ECV for $BS_i = \Sigma$ count for each MS reporting $BS_i *$ number of MSs reporting $BS_i$ Thus, ECV for BS 422 may be calculated as:

ECV for BS422 = 3*2 + 2*2 = 10

Similarly, the ECV for each BS in each bin may be calculated as below:

TABLE 3

| First Bin (−75 dBm to −85 dBm | Second Bin (−86 dBm to −95 dBm) | Third Bin (−96 dBm to −105 dBm) |
| --- | --- | --- |
| ECV (BS 422) = 10 | ECV (BS 420) = 15 | ECV (BS 422) = 8 |
| ECV (BS 424) = 1 | ECV (BS 424) = 4 | ECV (BS 420) = 4 |
| ECV (BS 420) = 1 |  | ECV (BS 424) = 1 |

On determining the effective count value for each BS in a bin, the MSs may be grouped based on a common neighbor, starting from the BS having the highest ECV and moving in decreasing order of ECV at step 306. In the ongoing example, starting from the BS that has the highest ECV and going in decreasing order of ECV, the associated MSs may be grouped. Since BS 422 has the highest ECV in the first bin in Table 3, the MSs associated with BS 422 may be grouped together. Thus, MS 408 and MS 410 may form a group. Other groupings are indicated in Table 4 below.

TABLE 4

| First Bin (−75 dBm to −85 dBm) | Second Bin (−86 dBm to −95 dBm) | Third Bin (−96 dBm to −105 dBm) |
| --- | --- | --- |
| BS 422 ←→ {MS 408, MS 410} | BS 420 ←→ {MS 406, MS 418, MS 416} | BS 422 ←→ {MS 412, MS 406} |
| BS 424 ←→ {MS 414} | BS 424 ←→ {MS 412, MS 416} | BS 420 ←→ {MS 414, MS 408} |
| BS 420 ←→ {MS 404} |  | BS 424 ←→ {MS 418} |

The common neighbor BS for a group may be considered the primary neighbor BS for the group subject to the condition that the common BS has the greatest signal strength relative to each MS in the group. This can be achieved by discarding any MS from a group if that MS has already been included in a group in a higher signal strength bin or has been associated with a neighbor BS having a higher effective count value within the same bin. Following through with the example, the primary neighbor BS and the associated group of MSs may be identified as below:

TABLE 5

| Primary Neighbor | MS Groups |
| --- | --- |
| BS 422 | {MS 408, MS 410} |
| BS 424 | {MS 414, MS 412} |
| BS 420 | {MS 404, MS 406, MS 416, MS 418} |

In some embodiments, if a neighbor BS is only reported by a single MS, then the priority of the MS and the signal strength between the MS and the serving BS may be considered to determine if a group comprising the single MS is to be created. If the priority or Service Level Agreement (SLA) associated with the MS is high then the MS may be considered a group in itself. Also, if the signal strength between the MS and the serving BS is weak, the neighbor BS may be considered the primary neighbor for the MS. However, if the priority of the MS is low or the signal strength between the MS and the serving BS is high, then no primary neighbor may be identified for the MS.

Referring back to FIG. 1, on determining a primary neighbor for each group of MSs, the neighbor relation maintenance device may instruct each MS of each group, at step 206, to report signal strength measurements between it and the corresponding primary neighbor BS associated with the each group in a first time period. Thus, MS 408 and MS 410 (from Table 5) may be instructed to only report on BS 422 in a first time period. Thereafter, at step 208, the neighbor relation maintenance device may instruct each MS of each group to report signal strength measurements between the each MS and each neighbor BS in a predefined neighbor list associated with the each MS in a second time period. In other words, each MS may be instructed to perform global neighbor reporting after the predefined first time period expires. The global neighbor reporting may be performed by each MS for a duration equal to the second time period. The first and second time periods may be predefined or may be dynamically determined. For example, the first time period may initially be predefined to be 10 minutes. During this time window, the MSs may be instructed to only report signal measurements between themselves and their primary neighbor. After the expiry of 10 minutes, the MSs may be instructed to perform global neighbor reporting using the default neighbor list as explained in conjunction with FIG. 1. Thus, the MSs may alternate between reporting their primary neighbors and their global neighbors. On receiving measurements reports from the MSs when a global neighbor reporting is performed by the MSs, the neighbor relation maintenance device may again determine a primary neighbor for each MS as described earlier. Thus, a primary neighbor may be determined for each MS after a global neighbor reporting is performed by a MS. If, from successive measurement reports, a MS reports the same primary neighbor, then the MS may be assumed to be stationary. In this case, the first time period wherein the MS only reports the primary neighbor may be dynamically increased. On the other hand, if it is determined that a MS is constantly moving at a high speed, the second time period when the MS performs a global neighbor reporting may be increased. In some embodiments, if during the first time period, the signal strength between the MS and the primary neighbor BS deteriorates by a certain predefined degree, then the first time period for the MS may be dynamically changed such that the MS performs a global neighbor reporting immediately.

Figure 5:
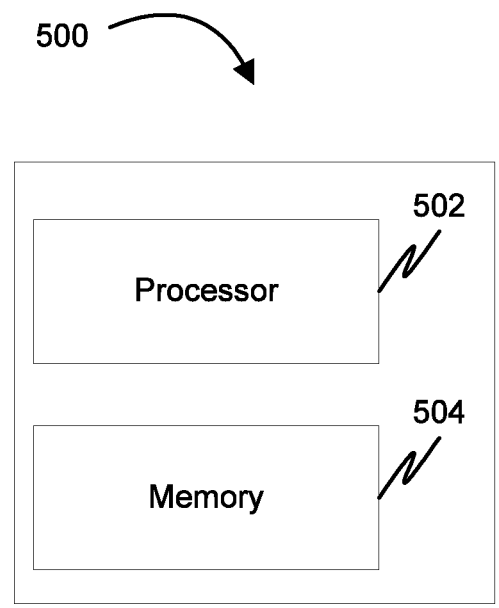
FIG. 5 is a block diagram of neighbor relation maintenance device in accordance with some embodiments of the present disclosure.

FIG. 5 illustrates a neighbor relation maintenance device 500 in accordance with some embodiments of the present disclosure. Neighbor relation maintenance device 500 may be implemented at a Base Station (BS) for neighbor reporting in accordance with some embodiments of the disclosure. Neighbor relation maintenance device may include one or more processors such as processor 502 and a memory 504 disposed in communication with the processor and storing processor-executable instructions. The instructions may include instructions to categorize a plurality of Mobile Stations (MSs) associated with a serving BS into one or more groups. In order to categorize the MSs into one or more groups, neighbor relation maintenance device 500 associated with the serving BS may first instruct all MSs associated with the serving BS to report signal strength measurements between the each MS and each neighbor BS. The MSs may then be grouped based on the signal strength measurements, such that each MS in a group has the highest relative signal strength with respect to a common neighbor BS as compared to the relative signal strength between any other neighbor BS. Categorizing the MSs into the one or more groups is described in detail in conjunction with FIG. 3.

On determining the groups of MSs, instructions executed by processor 502 may determine a primary neighbor BS for each group. The primary neighbor, in some embodiments, may correspond to the common neighbor BS relative to which each MS in a group of MSs has the greatest signal strength. The process of determining the primary neighbor is explained in detail in conjunction with FIG. 4. The instructions may further include instructions to instruct each MS of each group to report signal strength measurements between the each MS and the corresponding primary neighbor BS associated with the each group in a first time period. On expiry of the first time period, processor 502 may execute further instructions to instruct each MS of each group to report signal strength measurements between the each MS and each neighbor BS in a predefined neighbor list associated with the each MS in a second time period as explained with conjunction with FIG. 1.

Since the MSs only report on the primary neighbor BS during the first time period, the battery drain associated with the MSs may be minimized. Further, by reducing the number of entries to be maintained by the BS for each MS, the operation and performance of the BS may be improved.

FIG. 6 is a block diagram of an exemplary computer system for implementing embodiments consistent with the present disclosure. Variations of computer system 601 may be used for implementing neighbor relation maintenance device 500. Computer system 601 may comprise a central processing unit ("CPU" or "processor") 602. Processor 602 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602.

The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 610, 611, and 612. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and system for neighbor reporting in a mobile communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more non-transitory computer readable storage media may be utilized in implementing embodiments consistent with the present disclosure. A non-transitory computer readable storage medium refers to any type of physical memory on which information or data readable by a processor may be stored. Thus, a non-transitory computer readable storage medium may store instructions for execution by one or more processors, including instructions for causing the processor(s) to perform steps or stages consistent with the embodiments described herein. The term "non-transitory computer readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for neighbor reporting in a mobile communication network, the method comprising:
    categorizing, by a neighbor relation maintenance device, a plurality of mobile stations into one or more groups of mobile stations, wherein the plurality of mobile stations are associated with a serving base station;
    determining, by the neighbor relation maintenance device, a single primary neighbor base station for each of the one or more groups of mobile stations;
    instructing, by the neighbor relation maintenance device, the plurality of mobile stations in the one or more groups of mobile stations to report signal strength measurements between the plurality of mobile stations in the one or more groups of mobile stations and the corresponding single primary neighbor base station associated with the one or more groups of mobile stations in a first time period; and
    instructing, by the neighbor relation maintenance device, the plurality of mobile stations in the one or more groups of mobile stations to report signal strength measurements between each of the plurality of mobile stations in the one or more groups of mobile stations and the corresponding single primary neighbor base station in a predefined neighbor list associated with the plurality of mobile stations in a second time period, wherein the predefined neighbor list associated with the plurality of mobile stations includes one or more neighbor base stations accessible by the plurality of mobile stations.

2. The method of claim 1, wherein the categorizing the plurality of mobile stations into one or more groups of mobile stations further comprises:
    categorizing, by the neighbor relation maintenance device, the plurality of mobile stations into one or more bins based on the signal strength measurement between each of the plurality of mobile stations and the corresponding single primary neighbor base station in the predefined neighbor list;
    determining, by the neighbor relation maintenance device, for each of the one or more bins, an effective count of a number of times the corresponding single primary neighbor base station is reported in each of the one or more bins; and
    grouping, by the neighbor relation maintenance device, in each of the one or more bins, based on a decreasing order of the effective count, the one or more mobile stations associated with the corresponding single primary neighbor base station.

3. The method of claim 2, wherein each of the one or more bins is associated with an upper threshold signal strength value and a lower threshold signal strength value.

4. The method of claim 1, wherein the determining the single primary neighbor base station associated with each of the one or more groups of mobile stations further comprises:
    identifying, by the neighbor relation maintenance device, the single primary neighbor base station in the predefined neighbor list that reports a greatest signal strength relative to the plurality of mobile stations in the corresponding one of the one or more groups of mobile stations.

5. The method of claim 1, wherein the first time period or the second time period is predefined.

6. The method of claim 1, wherein the first time period or the second time period is dynamically determined.

7. The method of claim 1, wherein the categorizing a mobile station of the plurality of mobile stations into a group of the one or more groups of mobile stations is based on the signal strength measurement between the mobile station and the serving base station or a priority associated with the mobile station.

8. A neighbor relation maintenance device comprising:
    one or more processors;
    a memory coupled to the one or more processors which are configured to be capable of executing programmed instructions, which comprise the programmed instructions stored in the memory to:
    categorize a plurality of mobile stations into one or more groups of mobile stations, wherein the plurality of mobile stations are associated with a serving base station;
    determine a single primary neighbor base station for each of the one or more groups of mobile stations;
    instruct the plurality of mobile stations in the one or more groups of mobile stations to report signal strength measurements between the plurality of mobile stations in the one or more groups of mobile stations and the corresponding single primary neighbor base station associated with the one or more groups of mobile stations in a first time period;
    instruct the plurality of mobile stations in the one or more groups of mobile stations to report signal strength measurements between each of the plurality of mobile stations in the one or more groups of mobile stations and the corresponding single primary neighbor base station in a predefined neighbor list associated with the plurality of mobile stations in a second time period, wherein the predefined neighbor list associated with the plurality of mobile stations includes one or more neighbor base stations accessible by the plurality of mobile stations.

9. The neighbor relation maintenance device of claim 8, wherein the categorizing the plurality of mobile stations into one or more groups of mobile stations further comprises:
    categorizing the plurality of mobile stations into one or more bins based on the signal strength measurement between each of the plurality of mobile stations and the corresponding single primary neighbor base station in the predefined neighbor list;
    determining, for each of the one or more bins, an effective count of a number of times the corresponding single primary neighbor base station is reported in each of the one or more bins; and
    grouping, in each of the one or more bins, based on a decreasing order of the effective count, the one or more mobile stations associated with the corresponding single primary neighbor base station.

10. The neighbor relation maintenance device of claim 9, wherein each of the one or more bins is associated with an upper threshold signal strength value and a lower threshold signal strength value.

11. The neighbor relation maintenance device of claim 8, wherein the determining the single primary neighbor base station associated with each of the one or more groups of mobile stations further comprises:

identifying the single primary neighbor base station in the predefined neighbor list that reports a greatest signal strength relative to the plurality of mobile stations in the corresponding one of the one or more groups of mobile stations.

12. The neighbor relation maintenance device of claim 8, wherein the first time period or the second time period is predefined.

13. The neighbor relation maintenance device of claim 8, wherein the first time period or the second time period is dynamically determined.

14. The neighbor relation maintenance device of claim 8, wherein the categorizing an mobile stations of the plurality of mobile stations into a group of the one or more groups of mobile stations is based on the signal strength measurement between the mobile station and the serving base station or a priority associated with the mobile station.

15. A non-transitory computer readable medium having stored thereon instructions for neighbor reporting in a mobile communication network comprising machine executable code which when executed by at least one processor, causes the processor to perform steps comprising:

categorizing a plurality of mobile stations into one or more groups of mobile stations, wherein the plurality of mobile stations are associated with a serving base station;

determining a single primary neighbor base station for each of the one or more groups of mobile stations;

instructing to report signal strength measurements between the plurality of mobile stations in the one or more groups of mobile stations and the corresponding single primary neighbor base station associated with the one or more groups of mobile stations in a first time period; and instructing the plurality of mobile stations in the one or more groups of mobile stations to report signal strength measurements between each of the plurality of mobile stations in the one or more groups of mobile stations and the corresponding single primary neighbor base station in a predefined neighbor list associated with the plurality of mobile stations in a second time period, wherein the predefined neighbor list associated with the plurality of mobile stations includes one or more neighbor base stations accessible by the plurality of mobile stations.

16. The non-transitory computer readable medium of claim 15, wherein the categorizing the plurality of mobile stations into one or more groups of mobile stations further comprises:

categorizing the plurality of mobile stations into one or more bins based on the signal strength measurement between each of the plurality of mobile stations and the corresponding single primary neighbor base station in the predefined neighbor list;

determining, for each of the one or more bins, an effective count of a number of times the corresponding single primary neighbor base station is reported in each of the one or more bins; and grouping, in each of the one or more bins, based on a decreasing order of the effective count, the one or more mobile stations associated with the corresponding single primary neighbor base station.

17. The non-transitory computer readable medium of claim 16, wherein each of the one or more bins is associated with an upper threshold signal strength value and a lower threshold signal strength value.

18. The non-transitory computer readable medium of claim 15, wherein the determining the single primary neighbor base station associated with each of the one or more groups of mobile stations further comprises:

identifying the single primary neighbor base station in the predefined neighbor list that reports a greatest signal strength relative to the plurality of mobile stations in the corresponding one of the one or more groups of mobile stations.

19. The non-transitory computer readable medium of claim 15, wherein the first time period and or the second time period is predefined.

20. The non-transitory computer readable medium of claim 15, wherein the categorizing a mobile station of the plurality of mobile stations into a group of the one or more groups of mobile stations is based on the signal strength measurement between the mobile station and the serving base station, or a priority associated with the mobile station.

\* \* \* \* \*